United States Patent
Chang

(10) Patent No.: US 8,339,373 B2
(45) Date of Patent: Dec. 25, 2012

(54) TOUCH PANEL DISPLAY WITH INFRARED LIGHT SOURCE

(75) Inventor: Jen-Tsorng Chang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 441 days.

(21) Appl. No.: 12/608,153

(22) Filed: Oct. 29, 2009

(65) Prior Publication Data

US 2010/0238136 A1  Sep. 23, 2010

(30) Foreign Application Priority Data

Mar. 17, 2009  (CN) .......................... 2009 1 0300905

(51) Int. Cl.
*G06F 3/041* (2006.01)

(52) U.S. Cl. ........................ 345/173; 345/175

(58) Field of Classification Search ........... 345/173–178
See application file for complete search history.

(56) References Cited

U.S. PATENT DOCUMENTS

| | | | |
|---|---|---|---|
| 7,515,143 B2* | 4/2009 | Keam et al. | 345/175 |
| 2005/0057530 A1* | 3/2005 | Hinckley et al. | 345/173 |
| 2007/0063981 A1* | 3/2007 | Galyean et al. | 345/173 |
| 2009/0027358 A1* | 1/2009 | hosono | 345/175 |
| 2009/0167656 A1* | 7/2009 | Ahn et al. | 345/87 |
| 2010/0225617 A1* | 9/2010 | Yoshimoto et al. | 345/175 |
| 2010/0259492 A1* | 10/2010 | Chang | 345/173 |

* cited by examiner

*Primary Examiner* — Chanh Nguyen
*Assistant Examiner* — Roy Rabindranath
(74) *Attorney, Agent, or Firm* — Altis Law Group, Inc.

(57) ABSTRACT

An exemplary touch panel display includes a display panel, a backlight module, two infrared cameras, and a processor. The display panel has a touch surface. The backlight module includes a light guide plate and a light source module. The light source module includes a first visible light source and a second infrared light source. The light guide plate is capable of transmitting the visible light and the infrared light through to the display panel. The infrared cameras are disposed in the light guide plate. The infrared cameras are to detect infrared light that is reflected from an object in contact with or adjacent the touch surface of the display panel and form images based on the detected infrared light. The processor is to receive the images outputted from the infrared cameras, and process the images to obtain a position of the object at the touch surface.

20 Claims, 3 Drawing Sheets

TOUCH PANEL DISPLAY WITH INFRARED LIGHT SOURCE

BACKGROUND

1. Technical Field

The present disclosure relates to touch panel displays and, particularly, to a touch panel display having an infrared light source.

2. Description of Related Art

A touch panel incorporated into a thin film transistor liquid crystal display (TFT LCD) is quite common nowadays. A typical such LCD includes a pair of glass plates which are separated by a layer of liquid crystal material. There are a number of different types of touch panels, such as resistive touch panels, surface acoustic wave touch panels, and capacitive touch panels.

A typical touch panel LCD has a touch panel arranged on a surface of the LCD. However, such arrangement inevitably increases the thickness and weight of the LCD. Furthermore, the touch panel may reduce the brightness and clarity of images displayed on the LCD.

Therefore, a touch panel display which can overcome the above mentioned problems is desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Various embodiments will now be described in detail below with reference to the drawings.

Figure 1:
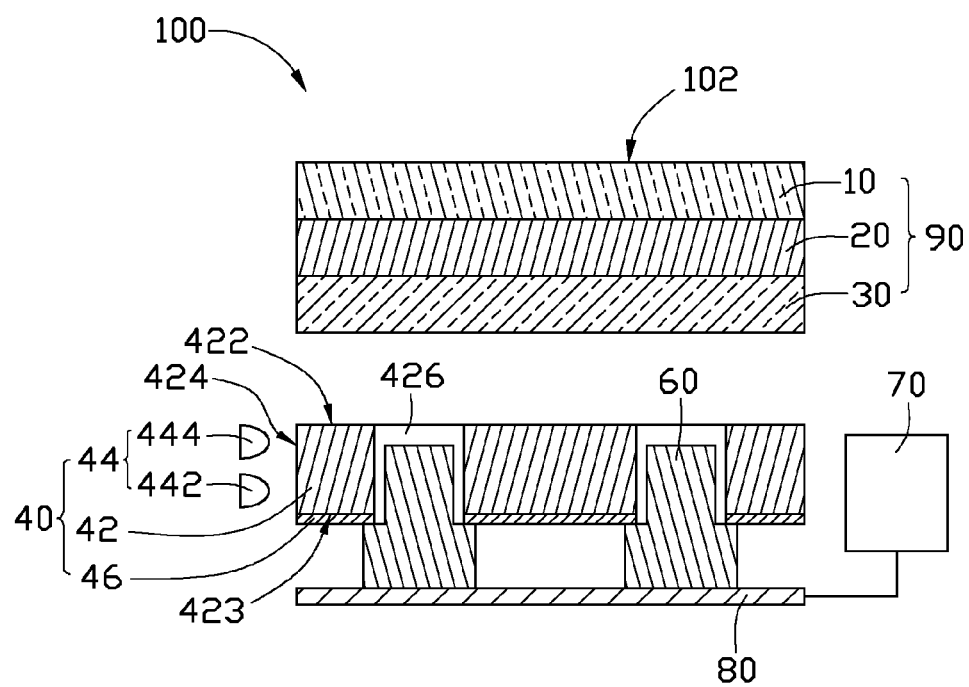
FIG. 1 is essentially a schematic, cross-sectional view of a touch panel display according to an exemplary embodiment of the present invention.
Figure 2:
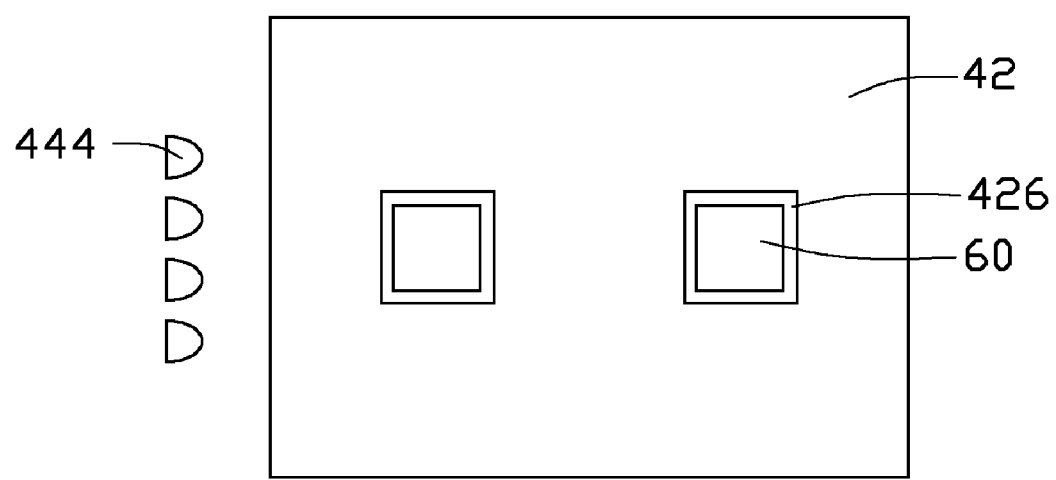
FIG. 2 is a schematic, top plan view of a backlight module of the touch panel display of FIG. 1.
Figure 3:
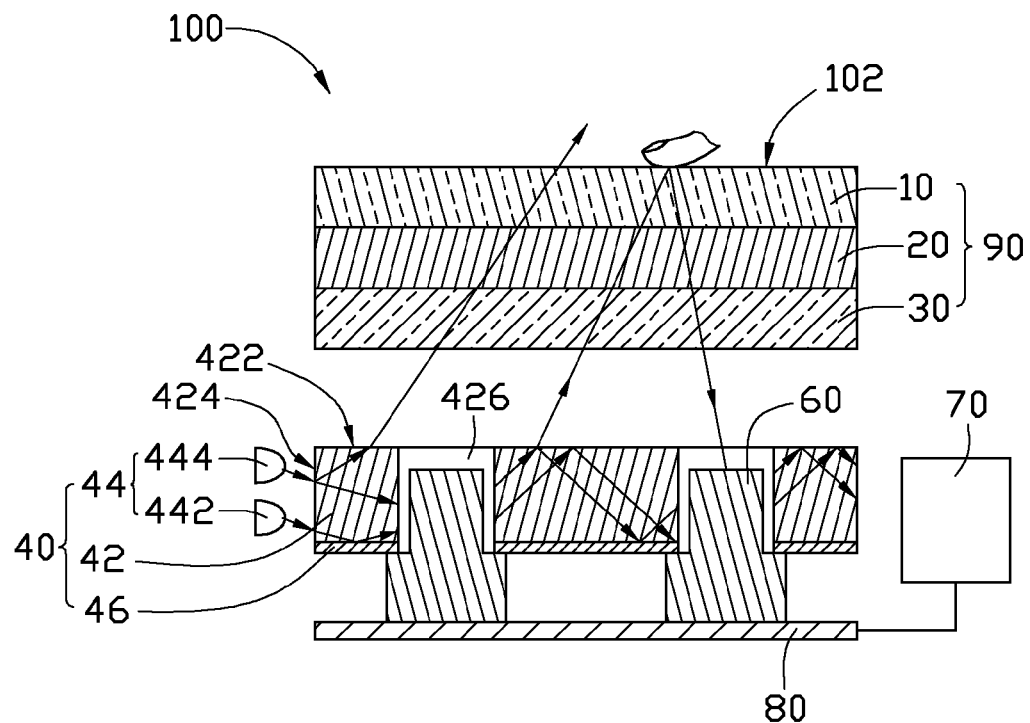
FIG. 3 is similar to FIG. 1, but showing essential optical paths of light emitted from a light source module of the backlight module of the touch panel display of FIG. 1, when a user's finger touches the touch panel display.

Referring to FIGS. 1-3, a touch panel display 100 includes a display panel 90, a backlight module 40, a plurality of infrared cameras 60, and a processor 70. In the present embodiment, the display panel 90 is an LCD panel.

The display panel 90 includes a first light pervious plate 10, a second light pervious plate 30, and a layer of liquid crystal material 20 arranged between the first light pervious plate 10 and the second light pervious plate 30. The first light pervious plate 10 includes a touch surface 102. The first and second light pervious plates 10, 30 can be transparent plates.

The backlight module 40 includes a light guide plate 42, a light source module 44 adjacent to a side edge of the light guide plate 42, and a reflective sheet 46 on a bottom surface 423 of the light guide plate 42.

The light guide plate 42 includes a top light emitting surface 422 facing the second light pervious plate 30, and a lateral side surface 424 adjoining the light emitting surface 422. The bottom surface 423 is opposite to the light emitting surface 422.

In the present embodiment, the light source module 44 includes four first light sources 442 and four second light sources 444. Each of the first light sources 442 is a visible-light LED for emitting visible light. Each of the second light sources 444 is an infrared light source. Depending on requirements, the second light sources 444 can be, for example, infrared LEDs or infrared lasers. In the present embodiment, the four first light sources 442 are arranged in a line that is parallel with the side surface 424. The four second light sources 444 are arranged in a line that is parallel with the side surface 424, above the first light sources 442. That is, the four second light sources 444 are closer to the display panel 90 than the four first light sources 442. It can be understood that the first light sources 442 and the second light sources 444 can be arranged in other ways as long as the light source module 44 can suitably emit visible light and infrared light. It can be understood that the number of first light sources 442 and the number of second light sources 444 are not limited to the present embodiment. Infrared light emitted from the second light sources 444 enters the light guide plate 42 through the side surface 424, exits from the light emitting surface 422, and then transmits through the second light pervious plate 30, the layer of liquid crystal material 20, and the first light pervious plate 10 in that order. Since the infrared light emitted from the second light sources 444 is in the infrared portion of the spectrum, it does not conflict with any image displayed on the display panel 90 in the visible portion of the spectrum.

A plurality of through holes 426 are defined in the light guide plate 42. The infrared cameras 60 are disposed in the through holes 426, respectively. In the present embodiment, the infrared cameras 60 are substantially evenly distributed across an area corresponding to the light emitting surface 422 of the light guide plate 42. In the present embodiment, there are two through holes 426 and two infrared cameras 60. The infrared cameras 60 are attached to a flexible circuit board 80. When an object such as a user's finger or a stylus is in contact with or adjacent the touch surface 102, infrared radiation reflected by the object is detected by the corresponding infrared camera 60. The detected infrared radiation forms an image in the infrared camera 60. The infrared cameras 60 can filter reflective radiation other than infrared radiation. The number and types of infrared cameras 60 can vary according to requirements. In general, the larger the area of the first light pervious plate 10, the more infrared cameras 60 are needed. The smaller the viewing angle of each infrared camera 60, the more infrared cameras 60 are needed. It can be understood that in some embodiments, there may be only a single infrared camera 60. In the present embodiment, each infrared camera 60 is a wide angle camera. The viewing angle of each infrared camera 60 is in a range from about 80 degrees to about 120 degrees.

The processor 70 is electrically connected with the infrared cameras 60 via the flexible circuit board 80. The processor 70 receives one or more images outputted from one or more of the infrared cameras 60, and processes the images to obtain the position of the object. In the present embodiment, the position is a Cartesian coordinate position of the touch surface 102.

In one embodiment, the touch panel display 100 is initialized when no object is in contact with or adjacent the touch surface 102 of the first light pervious plate 10. In this circumstance, each of the infrared cameras 60 detects an image of the corresponding region of the touch surface 102. The outputs of both of such images are processed by the processor 70, thereby creating a detected original image of the whole touch surface 102 with no object touching or adjacent the touch surface 102. Such detected original image is then stored and usable as a reference image. Then when an object touches or is adjacent any region of the touch surface 102, the infrared camera 60 corresponding to this region produces a bright spot image due to the infrared radiation reflected by the object. The processor 70 compares the bright spot image to the reference image, and obtains X, Y coordinates of the "touch point" of the object relative to the first light pervious plate 10 as a result of such comparison. That is, the "touch point" is a point of actual contact, or a point of close proximity.

In summary, the touch panel display 100 employs the infrared cameras 60 disposed in the backlight module 40 to detect the infrared radiation reflected from the object, and thereby identifies the Cartesian coordinate location of the object. No touch panel is required to be installed on a surface of the display panel 90 of the touch panel display 100. Thus, the touch panel display 100 can be compact and lightweight, and can provide high brightness and clarity of images viewed on the display panel 90.

While certain embodiments have been described and exemplified above, various other embodiments from the foregoing disclosure will be apparent to those skilled in the art. The present invention is not limited to the particular embodiments described and exemplified, but is capable of considerable variation and modification without departure from the scope and spirit of the appended claims.

The invention claimed is:

1. A touch panel display comprising:
a display panel having a touch surface;
a backlight module comprising a light guide plate and a light source module, the light guide plate comprising a light emitting surface facing the display panel, a side surface directly connected to and adjacent to the light emitting surface, and a bottom surface opposite to the light emitting surface, the light guide plate defining at least one through hole extending through the light emitting surface and the bottom surface, the light source module comprising at least one first light source and at least one second light source, the at least one first light source configured for emitting visible light, the at least one second light source configured for emitting infrared light, the at least one first light source and the at least one second light source only positioned on a same side of the side surface, and aligned with the side surface;
the light guide plate capable of transmitting the visible light and the infrared light through to the display panel;
at least one infrared camera partially extending into the at least one through hole, wherein a portion of the at least one infrared camera that partially extends into the through hole is smaller than a portion of the at least one infrared camera that does not extend into the through hole, and the at least one infrared camera configured for detecting any of the infrared light that is reflected from an object in contact with or adjacent the touch surface of the display panel, forming an image based on the detected infrared light, and outputting the image; and
a processor configured for receiving the image from the at least one infrared camera, and processing the image to obtain a position of the object at the touch surface.

2. The touch panel display of claim 1, wherein the position is a Cartesian coordinate position of the touch surface.

3. The touch panel display of claim 1, further comprising a flexible circuit board positioned on a side of the light guide plate facing away from the light emitting surface, wherein the at least one infrared camera is disposed on the flexible circuit board.

4. The touch panel display of claim 1, wherein the light emitted from the at least one first light source and the at least one second light source enters the light guide plate via the side surface, exits from the light emitting surface, and then transmits through the display panel.

5. The touch panel display of claim 1, wherein the at least one infrared camera is a plurality of infrared cameras, which are substantially evenly distributed across an area corresponding to the light emitting surface of the light guide plate.

6. The touch panel display of claim 1, wherein the at least one second light source is above the at least one first light source, and is closer to the display panel with respect to the at least one first light source.

7. The touch panel display of claim 1, wherein the display panel is a liquid crystal display (LCD) panel.

8. The touch panel display of claim 1, wherein the number of the at least one first light source is more than one, the more than one first light sources are arranged in a line that is parallel with the side surface; and wherein the number of the at least one second light source is more than one, the more than one second light source are arranged in another line that is parallel with the side surface, and are closer to the display panel with respect to the more than one first light sources.

9. The touch panel display of claim 1, wherein the backlight module further comprises a reflective sheet, the reflective sheet is attached on the bottom surface to reflect light rays from the at least one first light sources and the at least one second light sources, and thus to prevent the light rays from exiting from the bottom surface.

10. A touch panel display comprising:
a display panel comprising a first transparent plate, a second transparent plate, and a layer of liquid crystal material arranged between the first transparent plate and the second transparent plate, the first transparent plate having a touch surface;
a backlight module comprising a light guide plate and a light source module positioned adjacent to the light guide plate,
the light guide plate comprising a light emitting surface facing the display panel, a side surface directly connected to and adjacent to the light emitting surface, and a bottom surface opposite to the light emitting surface, the light guide plate defining one or more through holes extending through the light emitting surface and the bottom surface, the light source module comprising at least one first light source and at least one second light source, the at least one first light source configured for emitting visible light, the at least one second light source configured for emitting infrared light, the light guide plate capable of transmitting the visible light and the infrared light through to the display panel, the at least one first light source and the at least one second light source only positioned on a same side of the side surface, and aligned with the side surface; the second transparent plate, the layer of liquid crystal material, and the first transparent plate all capable of transmitting the visible light and the infrared light received via the light emitting surface of the light guide plate;
one or more infrared cameras partially extending into the one or more through holes, wherein a portion of the one or more infrared cameras that partially extends into the through hole is smaller than a portion of the one or more infrared camera that does not extend into the through hole, and each of the one or more infrared cameras configured for detecting infrared radiation corresponding to the infrared light which is reflected from an object in contact with or adjacent the touch surface of the display panel, forming an image based on the detected infrared radiation, and outputting the image; and a processor configured for receiving one or more of the images outputted from the one or more infrared cameras and processing the one or more images to obtain a coordinate position of the object at the touch surface.

11. The touch panel display of claim 10, wherein the coordinate position is an X-Y Cartesian coordinate system position.

12. The touch panel display of claim 10, further comprising a flexible circuit board positioned on a side of the light guide plate facing away from the light emitting surface, wherein the one or more infrared cameras are disposed on the flexible circuit board.

13. The touch panel display of claim 10, wherein the light emitted from the at least one first light source and the at least one second light source enters the light guide plate through the side surface, exits from the light emitting surface, and then transmits through the display panel.

14. The touch panel display of claim 10, wherein the one or more infrared cameras are a plurality of infrared cameras, which are substantially evenly distributed across an area corresponding to the light emitting surface of the light guide plate.

15. The touch panel display of claim 10, wherein the number of the at least one first light source is more than one, the more than one first light sources are arranged in a line that is parallel with the side surface; and wherein the number of the at least one second light source is more than one, the more than one second light source are arranged in another line that is parallel with the side surface, and are closer to the display panel with respect to the more than one first light sources.

16. The touch panel display of claim 10, wherein the backlight module further comprises a reflective sheet, the reflective sheet is attached on the bottom surface to reflect light rays from the at least one first light sources and the at least one second light sources, and thus to prevent the light rays from exiting from the bottom surface.

17. A touch panel display comprising:
a display panel having a touch surface;
a backlight module comprising a light guide plate and a light source module, the light guide plate having a light emitting surface generally adjacent to the display panel, a side surface directly connected to and adjacent to the light emitting surface, and a bottom surface opposite to the light emitting surface, the light guide plate defining a plurality of through holes-extending through the light emitting surface and the bottom surface, the light source module comprising at least one first light source and at least one second light source, the at least one first light source configured for emitting visible light, the at least one second light source configured for emitting infrared light, the at least one first light source and the at least one second light source only positioned on a same side of the side surface, and aligned with the side surface;
infrared light emitted from the at least one second light source entering the light guide plate through the side surface, emitting from the light emitting surface, and then transmitting through the display panel; a flexible circuit board positioned on a side of the light guide plate facing away from the light emitting surface;
a plurality of infrared cameras attached to the flexible circuit board and partially extending into the through holes, respectively, wherein a portion of the plurality of infrared cameras that partially extends into the through holes is smaller than a portion of the plurality of infrared cameras that does not extend into the through holes, and each of the infrared cameras configured for detecting any of the infrared light reflected from an object in contact with or adjacent the touch surface of the display panel, and forming an image based on the detected infrared light; and
a processor configured for receiving the image and processing the image to obtain a position of the object at the touch surface.

18. The touch panel display of claim 17, wherein the light emitted from the at least one second light source enters the light guide plate through the side surface, exits from the light emitting surface, and then transmits through the display panel.

19. The touch panel display of claim 17, wherein the number of the at least one first light source is more than one, the more than one first light sources are arranged in a line that is parallel with the side surface; and wherein the number of the at least one second light source is more than one, the more than one second light source are arranged in another line that is parallel with the side surface, and are closer to the display panel with respect to the more than one first light sources.

20. The touch panel display of claim 17, wherein the backlight module further comprises a reflective sheet, the reflective sheet is attached on the bottom surface to reflect light rays from the at least one first light sources and the at least one second light sources, and thus to prevent the light rays from exiting from the bottom surface.

* * * * *